May 24, 1960 L. LOEVENBRUCK 2,937,949
CHEESE BOX
Filed Dec. 27, 1956
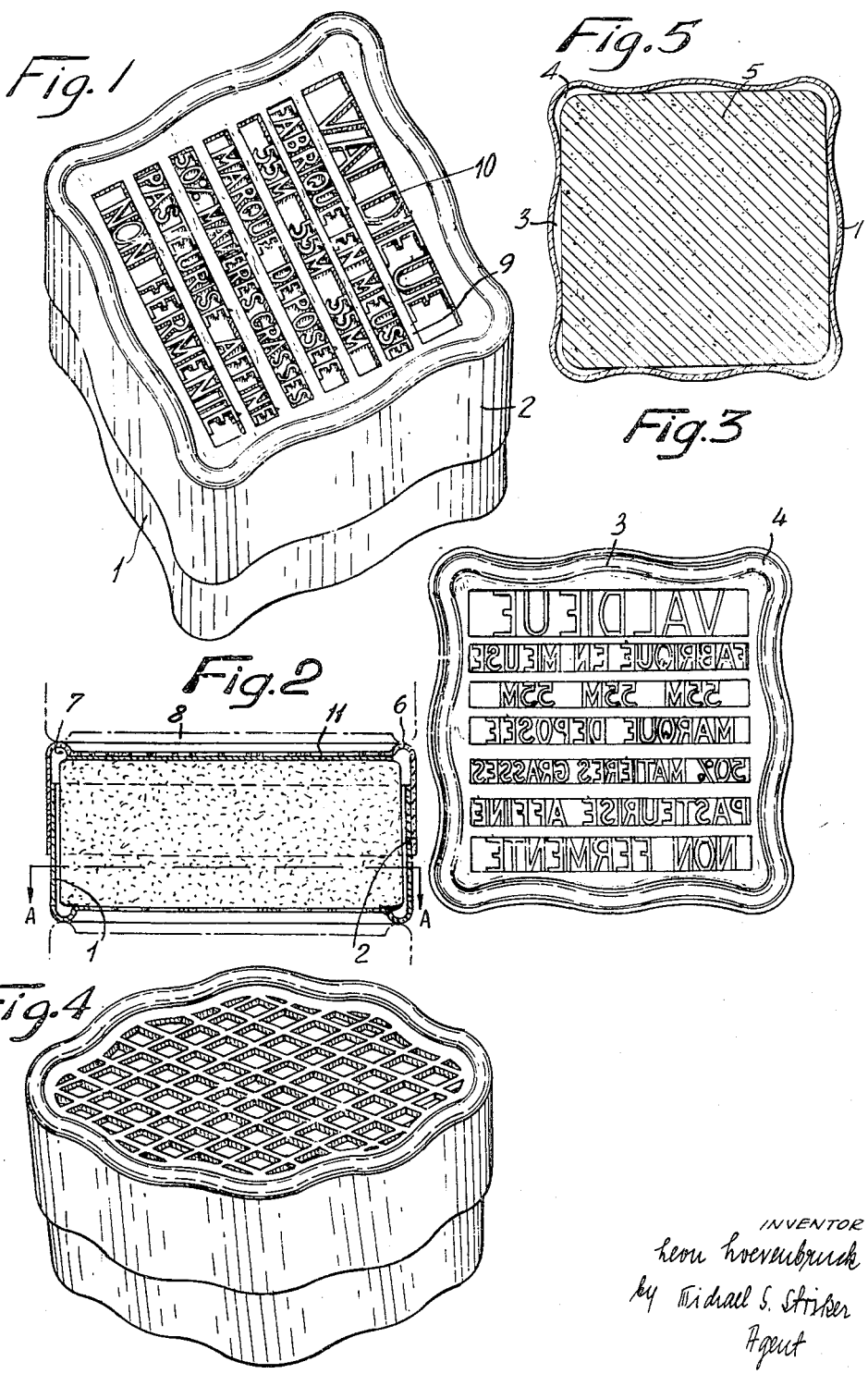

United States Patent Office 2,937,949
Patented May 24, 1960

2,937,949

CHEESE BOX

Leon Loevenbruck, Dieue-sur-Meuse, France, assignor to Etablissements Leon Loevenbruck & Cie, Dieue-sur-Meuse, France, an anonymous society of France Filed Dec. 27, 1956, Ser. No. 630,892

Claims priority, application France Jan. 9, 1956

1 Claim. (Cl. 99—171)

This invention relates to a box intended to contain cheese or similar perishable substances. It is a known fact that the boxes intended for this purpose have hitherto been made of permeable materials, particularly wood, so that, although their mechanical strength is sufficient, they retain the property of allowing free passage to air and steam, enabling the cheese, as it were, to "breathe" within its packing.

Although plastics have been widely used for the last few years for the manufacture of different types of boxes, they have not yet been adopted for the conservation and transportation of cheese, as on account of their impermeability these new materials could not be given the conventional shapes so far used in the cheese industry.

This invention covers a new type of box, moulded in plastic material such as polystyrene, which meets the requirements of this use. This box is more particularly characterized by the following features:

(a) The body and the lid fitted over it have side walls with ribs projecting inside and on which the sides of the cheese rest, intervals being thus provided between the ribs so as to promote the circulation of air between the boxes when the latter are packed in cases, to prevent heating of fermentable products, to make the cheese keep for a considerably longer time, to give the box greater strength with a small thickness, to save material and make the box original in appearance.

The said ribs can preferably be provided by giving the sides of the box a corrugated form.

For the same reasons, when the box has a square or rectangular base, it is advantageous for the corners to be profiled.

(b) A ridge or raised gutter around the upper and lower faces provides a certain space between the said faces of stacked boxes and also promotes air circulation while at the same time acting in conjunction with the vertical ribs to improve the rigidity of the box.

(c) The upper and lower faces have large perforations over substantially the whole area surrounded by the said ridge. These perforations can be obtained in particular by only leaving inscriptions such as descriptive names, technical characteristics of the cheese, address, etc., standing out in solid lettering.

Transparent plastic material can also be used and a label placed between the cheese and the perforated lid, so that the buyer can at the same time see both the said label and the words formed by the transparent parts of the lid. With this arrangement the label can even be dispensed with, if desired; in any case it is unnecessary to stick it, it suffices to lay it on the cheese before the lid is put on the box.

As an illustration and to make this description more intelligible the following drawings are attached, in which:

Fig. 1 is a perspective view of a box according to the invention,

Fig. 2 is a vertical section and Fig. 3 is a plane view of the box shown in Fig. 1 (the lid being supposed to be removed in Fig. 3), Fig. 4 is a view in elevation of a different form of embodiment, and Fig. 5 is a sectional view of the box taken along lines A—A of Fig. 2.

In the form of embodiment shown in Figs. 1 to 3 the box is substantially square and consists of two vertically corrugated telescopic parts, a bottom 1 and a lid 2 telescoped over bottom 1. The sides of these two parts, instead of being plain, have vertical corrugations and their corners are rounded. The effect of these corrugations and corners is to form free channels 3 and 4 between the inwardly extending curved projections of the side walls of the box and the cheese 5 for the purpose of ventilating the latter.

A ridge 6 extends all round the upper and lower faces and forms an inwardly facing groove 7 which, being in communication with the spaces 3 and 4, combines with them in ensuring the said ventilation.

These corrugations form vertical ventilating passageways and with the ridge constitute a reinforcement of the walls, giving the box excellent rigidity and permitting the walls to be thin without impairing the strength of the box as a whole; this feature is all the more important as the boxes must be able to bear substantial weights when they are stacked for transportation or storage.

Furthermore, as the ridges 6 rest on one another when the boxes are stacked, spaces such as 8 (Fig. 2) remain between them and ensure ventilation between the boxes. It is also to be noted that the lateral corrugations create empty spaces between the sides of adjoining boxes, which also provides for ventilation.

The top and bottom of the box have perforations distributed substantially over their entire surfaces. These perforations may be of any suitable shape provided they extend over a sufficiently large part of the surface to enable the cheese to be well ventilated on all its faces. In the embodiment shown in Figs. 1 to 3 the perforations are obtained on lid 2 by cut-outs separated by strips 9. Some of the cut-outs are profiled to form solid lettering 10. This particular arrangement has the advantage, if the bix is made of transparent plastic material, of enabling an interposed label to be seen by transparency as well as through the spaces in the top surface of the lid. This, in particular, makes it unnecessary to stick the label on the lid.

It will be realized that many special forms can be adopted for the vertical corrugations, the peripheric ridges and the perforations; and that the base and vertical wall of the box may be of any suitable shape. This leaves great freedom to the designer in the choice of special profiles, enabling the box to be given a special distinctive shape and allows the creation of boxes of greatly varied designs, all equally suitable for the technical purpose for which they are intended. For instance, the side corrugations, instead of being wide as in Figs. 1 and 3, can be made shorter and placed close to each other; or they could even be replaced by a wall, flat externally, but presenting vertical projecting ribs inside, which keep the sides of the cheese at a certain distance from the wall and thus leave ventilation spaces equivalent to the spaces 3 and 4 of Fig. 3.

I claim:

A package comprising a container, a solid body capable of producing gas positioned therein, said container comprising vertically corrugated telescoping parts, each of said parts having an end wall, at least one of which is perforated, and at least one of said end walls having a peripheral inwardly facing groove which is in communication with the inwardly facing channels formed by said corrugated walls, the peripheral surface of said enclosed body contacting only the inwardly extending curved projections of said corrugations, whereby the surface of said contained body coacts with the corrugated surface of said container to form vertical ventilating passageways which communicate with said inwardly facing groove.

References Cited in the file of this patent

UNITED STATES PATENTS

| | | |
|---|---|---|
| 549,043 | Worswick | Oct. 29, 1895 |
| 1,509,549 | Freeland | Sept. 23, 1924 |
| 1,892,527 | Gray | Dec. 27, 1932 |
| 2,064,518 | Brogden | Dec. 15, 1936 |
| 2,212,340 | Davis | Aug. 20, 1940 |
| 2,614,727 | Robinson | Oct. 21, 1952 |
| 2,618,937 | Francis | Nov. 25, 1952 |